March 9, 1948. E. O. GARNETT 2,437,596
MACHINE FOR FORMING CURVED SURFACES
Filed Aug. 18, 1945 2 Sheets-Sheet 1

INVENTOR
Edward Oscar Garnett
BY Francis E. Boyce
ATTORNEY

March 9, 1948. E. O. GARNETT 2,437,596
MACHINE FOR FORMING CURVED SURFACES
Filed Aug. 18, 1945 2 Sheets-Sheet 2

INVENTOR
Edward Oscar Garnett
BY
Francis E. Boyce
ATTORNEY

Patented Mar. 9, 1948

2,437,596

UNITED STATES PATENT OFFICE 2,437,596

MACHINE FOR FORMING CURVED SURFACES

Edward Oscar Garnett, Colbyn, Pretoria, Transvaal, Union of South Africa

Application August 18, 1945, Serial No. 611,421
In the Union of South Africa May 15, 1945

3 Claims. (Cl. 125—11)

This invention relates to means for forming internal and external curves with precision and in particular to means for moving a diamond or like point to cut the required curve on the edge of a grinding wheel.

The object of the invention is to provide a machine embodying a rest for a cutting tool and means for moving the rest and the tool mounted thereon in a predetermined precise circular path. More particularly the object of the invention is to provide a mounting for the tool rest permitting universal sliding motion of the same in one plane and controlling said movement by the limited space occurring between a part having a circle of fixed diameter and an inner circle which can be varied in diameter the difference in the diameters of the two circles limiting the extent of the circular movement of the cutting point of a tool carried by the rest.

Figure 1:
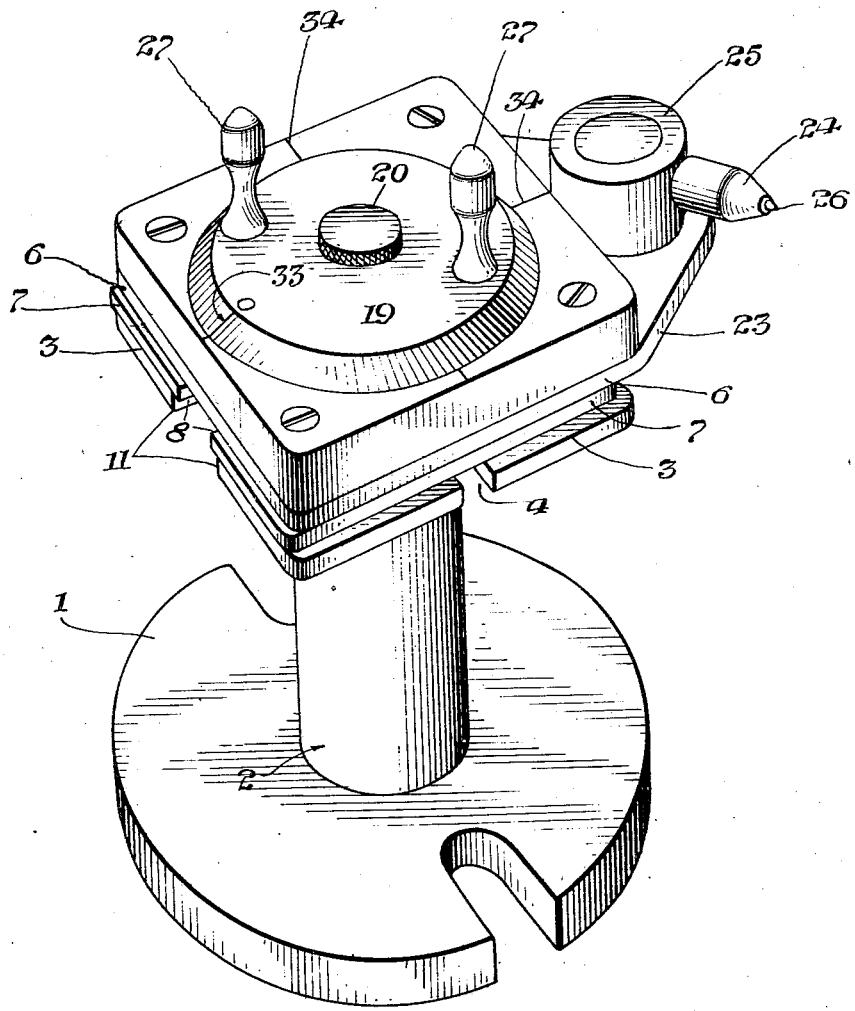
Figure 2:
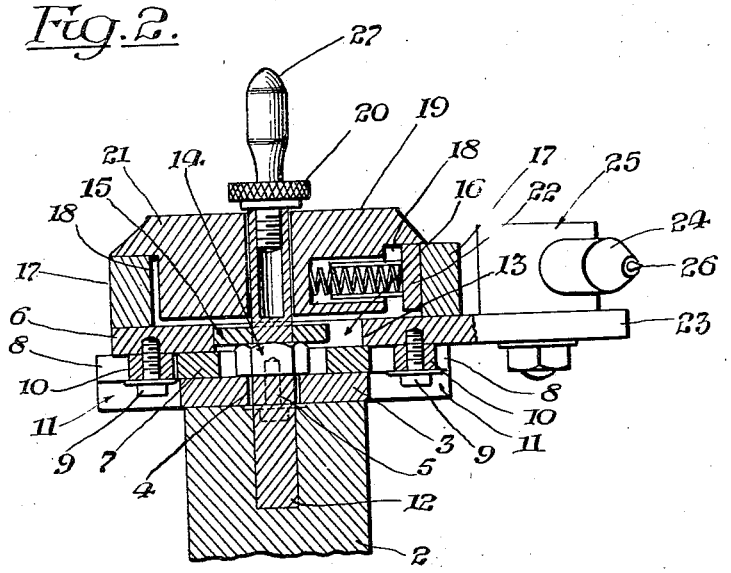
Figure 3:
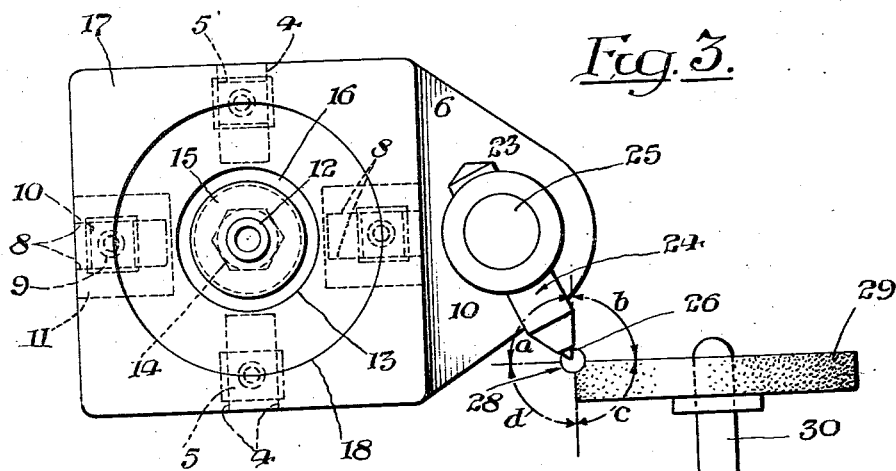
Figure 4:
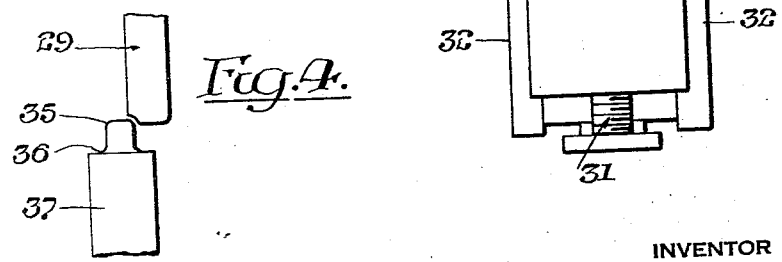

A preferred form of the invention is shown in the accompanying drawings in which Fig. 1 is a perspective view of the device embodying the invention, Fig. 2 is an elevation of the device partly in section, Fig. 3 is a plan view with parts centrally located and with parts removed, and Fig. 4 shows a detail.

In the drawings 1 is a base by which the machine may be clamped in position to cut and dress a grinding wheel. The base supports a pedestal 2 carrying a fixed base 3 having two parallel grooves 4 in which slide fitted pads 5 secured to a plate 7 adapted to slide on base 3 and to carry a tool rest plate 6. Between base 3 and plate 6 is the sliding plate 7 having a pair of parallel grooves 8 to accommodate sliding pads 10 secured by screws 9 to tool rest plate 6. Below pads 10 base plate 3 has two clearance slots 11 so that the required movement of pads 10 is unhampered. The result of said mounting is that tool rest plate 6 may have a limited movement in any direction in one plane. Centrally plate 7 has a circular hole allowing the universal movement desired about a central pin 12 fixed vertically in the pedestal 2. Tool rest plate 6 has a central hole 13 of definite and precise diameter. Over pin 12 and resting on a shoulder 14 is a replaceable disc 15 also of precise diameter. With the parts in position as described the limit of movement of tool rest plate 6 is the difference in the diameters of the disc 15 and the hole 13, or the size of space 16. 17 is a driving plate secured to tool rest plate 6 and having a central circular hole 18. Rotatably mounted on pin 12 is a driving cap 19 and held in place by set screw 20. Said cap 19 has a cylindrical part 21 projecting into but smaller in diameter than hole 18 and having a radially spring loaded plunger 22. The extension 23 of the tool rest plate 6 is adapted to carry the tool 24 in a holder 25. The tool, as shown in the drawings, may be a diamond point 26. Means 27 for rotating the cap 19 may consist of two vertical handles secured to the cap 19.

In operation, rotation of the cap 19 will make the point 26 move through a circle 28, diagrammatically illustrated in Fig. 3, said circle consisting of the four quadrants a, b, c, d. In Fig. 3 is shown a grinding wheel 29 adapted to be rotated by its spindle 30. It is obvious that the quadrant C of the circle 28 can be cut into the edge of the grinding wheel 29 by the diamond point 26 when the rotating wheel 29 is moved towards the point 26 by means for example of the screw 31 and in the slide 32, and when the cap 19 is rotated to move the various parts in the manner above described. Such a movement and setting will give a female curve in the edge of the wheel 29. By setting up the wheel again and oscillating the cap 19 so that the point 26 moves through the quadrant "a" and suitably adjusting the position of wheel 29 a similar male curve can be cut in the edge of wheel 29. To determine the required movement of point 26 the cap 19 may have a mark 33 thereon which can be made to register with the quadrant marks 34 on the top of the driving plate 17.

The precision of the movement of point 26 and therefore the precision of the work produced by the machine is due to the ease with which the diameter of the replaceable disc 15 is determined.

The machine has been described for use in cutting the desired curves on the edges of grinding wheels. With such wheels the radii 35, 36 (Fig. 4) may be produced on, for example, a punch 37 by the use of wheel 29 in a well known grinding operation.

The invention has been described for use in cutting curves in the edges of grinding wheels but it is obvious that the same machine could be used in a lathe for cutting radii on material mounted therein.

The invention provides a machine by the use of which curves of predetermined size and with precise radii may be cut. The required sizes being controlled by providing easily produced replaceable discs 15 readily made to the dimensions demanded.

What I claim as new and desire to secure by Letters Patent is:

1. A machine for forming curved surfaces having in combination a tool rest plate, a tool clamp on the plate, a tool therein, supports for the plate allowing universal movement thereof in one plane on said supports, a centrally fixed spindle threaded through said plate, a circular hole of precise size in said plate and about the spindle, a removable disc of a determined diameter on said spindle, said disc being smaller in diameter than the circular hole in the tool rest plate, driving means for pressing the tool rest plate against the disc and for moving it to make contact round or partly round the circumference of the disc to provide movement of the point of the tool through a circle or a part of a circle restricted in diameter to the difference in the diameters of the circular hole in the tool rest plate and the removable disc threaded on the central spindle.

2. A machine for forming curved surfaces having in combination a tool rest plate, a tool clamp on the plate, a tool therein, supports for the plate allowing universal movement thereof in one plane on said supports, a centrally fixed spindle threaded through said plate, a spring loaded plunger rotatable on the central spindle, a driving plate having a cylinder co-operating with the plunger, said plate being attached to the tool rest plate, means for rotating said plunger, a circular hole of precise size in said tool rest plate and about the spindle, a removable disc of a determined diameter on said spindle, said disc being smaller in diameter than the circular hole in the tool rest plate, said rotatable plunger adapted to press the tool rest plate against the disc and for moving it to make contact round or partly round the circumference of the disc to provide movement of the point of the tool through a circle or a part of a circle restricted in diameter to the difference in the diameters of the circular hole in the tool rest plate and the removable disc threaded on the central spindle.

3. A machine for forming curved surfaces as claimed in claim 1, characterized in the tool having a diamond cutting point.

EDWARD OSCAR GARNETT.

REFERENCES CITED

The following references are of record in the file of this patent:

UNITED STATES PATENTS

| Number | Name | Date |
|---|---|---|
| 2,222,392 | Baerer | Nov. 19, 1940 |